United States Patent
Stiglic et al.

(10) Patent No.: US 10,122,557 B1
(45) Date of Patent: Nov. 6, 2018

(54) SYNCHRONIZATION METHOD OF AN ACTIVE LOAD MODULATION CLOCK WITHIN A TRANSPONDER

(71) Applicant: STMicroelectronics razvoj polprevodnikov d.o.o., Ljubljana (SI)

(72) Inventors: Maksimiljan Stiglic, Maribor (SI); Kosta Kovacic, Orehova vas (SI)

(73) Assignee: STMICROELECTRONICS RAZVOJ POLPREVODNIKOV D.O.O., Ljubljana (SI)

( * ) Notice: Subject to any disclaimer, the term of this patent is extended or adjusted under 35 U.S.C. 154(b) by 0 days.

(21) Appl. No.: 15/966,948

(22) Filed: Apr. 30, 2018

(30) Foreign Application Priority Data

May 2, 2017 (EP) .................................. 17169020

(51) Int. Cl.
*H03C 5/00* (2006.01)
*H04L 27/20* (2006.01)
*H04L 27/36* (2006.01)
*H04L 27/04* (2006.01)

(52) U.S. Cl.
CPC .......... *H04L 27/2071* (2013.01); *H04L 27/04* (2013.01); *H04L 27/361* (2013.01)

(58) Field of Classification Search
CPC .... H04L 27/2071; H04L 27/04; H04L 27/361
USPC ....... 375/268, 271, 300, 295, 316, 375, 376; 455/41.1, 78, 126
See application file for complete search history.

(56) References Cited

U.S. PATENT DOCUMENTS

| | | | | |
|---|---|---|---|---|
| 9,331,748 B2 * | 5/2016 | Bernard | ............ | G06K 19/0723 |
| 2017/0279596 A1 * | 9/2017 | Michel | ............... | G06K 19/0723 |
| 2018/0006801 A1 * | 1/2018 | Hung | ................. | G06K 19/0723 |

FOREIGN PATENT DOCUMENTS

| EP | 2727255 B1 | 5/2014 |
|---|---|---|
| WO | 2015003870 A1 | 1/2015 |

* cited by examiner

*Primary Examiner* — Dhaval Patel
(74) *Attorney, Agent, or Firm* — Slater Matsil, LLP

(57) ABSTRACT

A method of wireless communication includes transmitting frames from a transponder to a reader and synchronizing between a reader carrier frequency and an active load modulation (ALM) carrier frequency within each transmitted frame. Each transmitted frame includes ALM carrier bursts generated from subcarrier modulation by binary phase shift keying (BPSK) data encoding and producing signal oscillations at a transponder antenna after each ALM carrier burst generation, The synchronizing occurs at each phase change of the data encoding when no burst is generated during a half period of the subcarrier preceding the phase change and a half period of the subcarrier following this phase change. The transponder antenna has a moderate quality factor sufficient to naturally damp the signal oscillations so that the synchronizing is performed without performing any controlled signal oscillations damping.

18 Claims, 3 Drawing Sheets

SYNCHRONIZATION METHOD OF AN ACTIVE LOAD MODULATION CLOCK WITHIN A TRANSPONDER

CROSS-REFERENCE TO RELATED APPLICATIONS

This application claims priority to European Patent Application No. 17169020.9, filed on May 2, 2017, which application is hereby incorporated herein by reference.

TECHNICAL FIELD

Embodiments of the invention relate to a synchronization method of an active load modulation clock within a transponder, and a corresponding transponder.

BACKGROUND

A transponder may be a passive one, i.e. performing load modulation of the magnetic field generated by the reader.

A transponder may be an active one. When a transponder is an active one, i.e. using active load modulation (ALM) for transmitting information to the reader, the transponder generates the magnetic field which simulates load modulation of the reading device field performed by a passive transponder.

ALM needs to be used in case signal generated by passive load modulation is not strong enough to be detected by an RFID interrogator device or reader. This is the case when transponder's antenna is small or located in a challenging environment.

All ALM systems share same requirement to actively transmit bursts of ALM carrier frequency, which are identical to the carrier frequency of the reader. This means that each burst of the ALM carrier frequency starts with the same phase difference to the carrier signal emitted by the reader. Unchanged phase also implies that the two frequencies are identical. Maximum phase drift of transponder reply signal comparing to reader carrier signal inside complete transponder reply frame is specified to be 30° in draft amendment to ISO/IEC 14443 standard.

Constant phase difference between the ALM carrier and reader carrier can be achieved for example in the following way.

Once the ALM transmission starts (complete transmission sequence is called frame and comprises series of carrier bursts separated by gaps) a frequency source in the transponder is used to generate ALM carrier frequency. The frequency source is occasionally corrected during the gaps in the frame when actual carrier bursts are not emitted. During these gaps only the reader carrier signal is present (on transponder antenna) so the reference frequency is available to re-adjust the ALM carrier frequency source. Such synchronization between the reader carrier frequency and the ALM carrier frequency is performed within each transmitted frame and is accordingly called there below In-Frame Synchronization (IFS).

An example of a device performing an IFS is disclosed in EP 272 7255 B1.

More precisely a phase locked loop (PLL) with voltage controlled oscillator (VCO), which generates clock signal with frequency equal to interrogator carrier frequency, is used to generate the ALM clock. Outside of transponder reply frame, when carrier clock is constantly available at PLL input, PLL is put in lock mode. In this lock mode, feedback is closed and PLL is locked to digitized reader carrier signal.

In transponder reply frame, when ALM transmission takes place, the PLL is put in hold mode.

In hold mode PLL feedback is opened and the VCO continues to run with frequency which was previously established. The free-running frequency of VCO is defined by charge which is stored in loop filter. Frequency difference between ALM carrier signal generated by the VCO and reader carrier signal results in phase drift of ALM carrier signal comparing to interrogator carrier signal.

This frequency difference is caused by several sources.

First source is the difference of frequency generated by PLL system in which VCO is induced and the input carrier signal at the moment before the PLL is put on hold.

Second source is charge injection of switch which puts PLL in hold mode (charge injected by switch changes the voltage on VCO control pin, which results in change of VCO frequency).

The third effect is leakage on VCO control pin and loop filter (loop filter input is in high impedance state, voltage on this input is defined by stored charge, charge is modified by leakage current of electronic elements).

The phase drift generated by sources of frequency difference mentioned above has to be corrected before it drifts above the specified maximum. This is done by closing PLL feedback loop at appropriate moments inside transponder reply frame, where the ALM transmission does not take place and the clock signal extracted from interrogator carrier signal is restored on PLL input.

However, ALM carrier bursts produce at the transponder antenna, signal oscillations after each ALM carrier bursts generation. And, such oscillations may disturb the synchronization between the reader carrier frequency and the ALM carrier frequency.

A solution to this problem has been disclosed in WO 2015/033870 A1.

More precisely, in this document, the ALM carrier bursts are generated from a subcarrier modulation by a Binary Phase Shift Keying (BPSK) encoding.

The synchronization is performed in the gap between two transmission bursts. However, due to the higher amplitude during the transmission bursts period and the oscillation properties of the antenna, the signal amplitude on the antenna of the transponder decays slowly without application of specific measures. And, without such specific measures, the decay of the signal on the inductive capacity antenna last too long and does not let enough time for resynchronization.

Accordingly, the solution disclosed in WO 2015/033870 A1 to shorten this decay comprises performing a controlled damping of the oscillation by specific damping means which quickly stops the oscillation built by ALM transmission.

However, such a damping system increases complexity of the ALM transponder.

SUMMARY

Embodiments of the invention relate to wireless communication between a transponder and a reader, in particular embodiments a high frequency communication between a RFID transponder and a reader operating at 13.56 MHz, in particular RFID transponders using active load modulation (ALM) for communicating with the reader and more specifically to the synchronization between the reader carrier frequency and the ALM carrier frequency.

Embodiments of the invention can perform an in-frame synchronization (IFS) between a reader carrier frequency and an ALM carrier frequency in a simpler way leading to cost reduction and area reduction.

According to an embodiment, it is thus proposed to perform the in-frame synchronization of transponder when some phase change of BPSK (Binary Phase Shift Keying) code takes place, without performing any control damping through a dedicated damping system.

According to an aspect, a method of wireless communication from a transponder to a reader using active load modulation, called ALM, is proposed comprising frames transmission from the transponder to the reader and synchronization between a reader carrier frequency and an ALM carrier frequency performed within each transmitted frame.

Each frame transmission includes ALM carrier bursts generated from a subcarrier modulation by a BPSK data encoding and produces at the transponder antenna signal oscillations after each ALM carrier burst generation.

According to this aspect the synchronization occurs at each phase change of the data encoding when no burst is generated during the half period of the subcarrier preceding the phase change and the half period of the subcarrier following this phase change, and the transponder antenna has a moderate quality factor sufficient to naturally damp the signal oscillation and permit the synchronization without performing any controlled signal oscillations damping.

In other words, when the phase of BPSK signal changes so that the subcarrier half-periods where there is no transmission are attached there are 16 carrier periods available to perform synchronization. This time is in case of antenna LC tanks using moderate Q factors, sufficient to decay self-induced oscillation and perform synchronization to reader field.

The natural oscillation damping is thus sufficient for allowing the synchronization and no additional controlled oscillation damping through specific damping system is necessary.

One of ordinary skill in the art will be able to choose the value of such moderate antenna quality factor depending on the application to allow such in-frame synchronization without the need of performing a controlled signal oscillation damping.

As an example, which is no limitative, a quality factor smaller than or equal to 8 can be considered as being an acceptable moderate quality factor.

In case the quality factor is sufficiently low, for example smaller than 4, the natural oscillation damping is so fast that synchronization can be done in every non modulated part of the BPSK code without additional controlled oscillation damping.

However it is preferable not to use such low quality factors in the context of ALM transmission because in such a case ALM emission would have to be done at higher power to achieve the same result on reader antenna.

Thus, in order to limit the power it is preferable that the quality factor of the transponder antenna be greater than or equal to 4.

ISO/IEC 14443 type B data byte comprises 8 data bits, a start bit at 0 and stop bit at 1. This assures at least one BPSK phase change where 16 carrier periods are available for synchronization per 10 bits. However, in ISO/IEC 14443 type B a transmitted frame from the transponder to the reader comprises before the first data byte, a so called Start of Frame (SOF) including at least 10 bits "0" and 2 bits "1". Thus in the worst case (SOF) the minimum time between two phase changes where synchronization can be performed is 12 bits.

Maximum difference of the two frequencies can be calculated from maximum allowed phase drift and time between two synchronizations. The maximum phase drift specified in draft amendment to ISO/IEC 14443-2 is 30° ($\frac{1}{12}$ of one carrier frequency period). In 12 bits at 106 kb/s there are 1536 periods of 13.56 MHz carrier signal, which results in maximum difference of 54 ppm (appr. 735 Hz).

It is thus advisable that the generated ALM frequency be stable during the 12 bits hold duration when synchronization is not done.

And, a digital PLL system using a digitally control oscillator can for example fulfil such requirements.

Thus, according to an embodiment, the ALM carrier is provided by a digital phase locked loop including a digitally controlled oscillator, the digital locked loop receiving the reader carrier and being in a hold mode in which the feedback loop is opened between each synchronization and in a lock mode in which the feedback loop is closed for performing each synchronization.

According to another aspect, it is proposed a transponder, configured to wireless communicate towards a reader using active load modulation (ALM) comprising a transmitter configured to transmit frames including ALM carrier bursts to the reader through an antenna. The transmitter includes an encoder configured to perform a Binary Phase Shift Keying data encoding, and a modulator configured to perform a subcarrier modulation with the data encoding and to generate the ALM carrier bursts leading to signal oscillations at the transponder antenna after each burst generation. A synchronization circuit is configured to perform within each transmitted frame, synchronization between a reader carrier frequency and the ALM carrier frequency at each phase change of the data encoding when no burst is generated during the half period of the subcarrier preceding the phase change and the half period of the subcarrier following this phase change. The transponder antenna has a moderate quality factor, typically smaller than or equal to 8 and preferably greater than or equal to 4, sufficient to naturally damp the signal oscillation and permit the synchronization without performing any controlled signal oscillations damping.

According to an embodiment, the synchronization circuit comprises a digital phase locked loop including a digitally controlled oscillator and a controller configured to put the digital phase locked loop in hold mode in which the feedback loop is opened between each synchronization and to close the feedback loop for performing each synchronization.

According to an embodiment, the transponder is configured to wireless communicate towards the reader according ISO/IEC 14443 type B protocol.

BRIEF DESCRIPTION OF THE DRAWINGS

Other advantages and features of the invention will appear in the detailed description below and in the appended drawings which are not limitative, in which.

DETAILED DESCRIPTION OF ILLUSTRATIVE EMBODIMENTS

Figure 1:
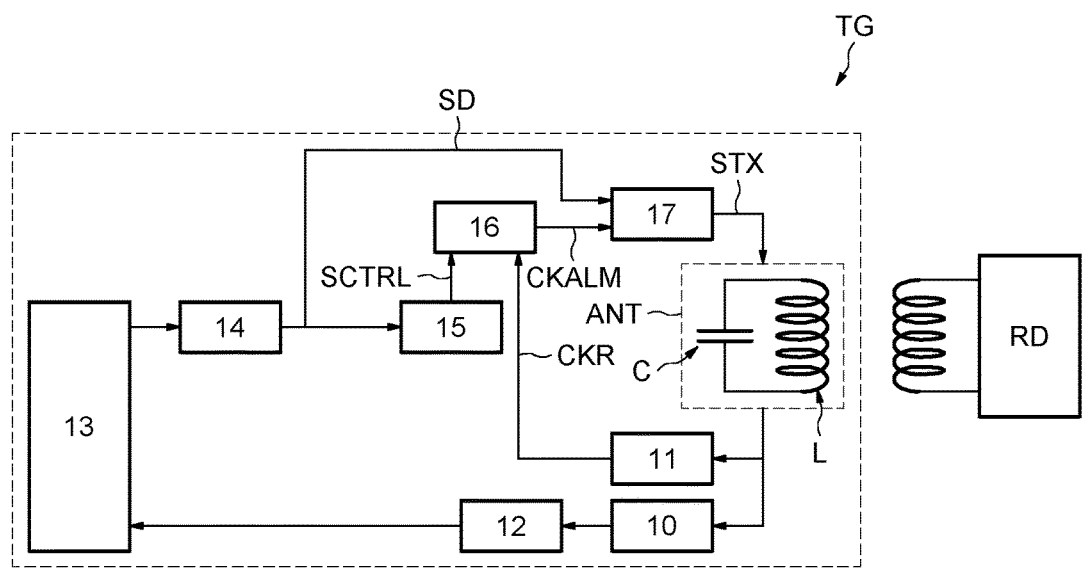
FIGS. 1-7 illustrate particular embodiments of the invention.

On FIG. 1, reference TG designates a transponder or tag configured to wireless communicate towards a reader RD reading active load modulation ALM according for example to ISO/IEC 14443 type B protocol. In this context, something that is in compliance with a standard is compliant with a version of the standard that was in existence at the effective filing date of this patent.

The transponder TG comprises a transmitter configured to transmit frames including ALM carrier bursts to the reader RD through an antenna ANT having a moderate quality factor, more precisely a quality factor smaller than or equal to 8.

The antenna comprises an inductive element L as well as one or several capacitors C.

The transponder comprises a demodulation circuit 10 coupled to a decoding circuit 12 for receiving data from the reader RD through antenna ANT.

The decoding circuit 12 provides data to a processing unit 13, for example, a processor, which provides also data to be sent to the reader.

The data may be, for example, application data of a NFC (Near Field Communication) application such as transaction such as a payment.

A circuit 11 extracts a clock signal CKL having a frequency equal to the reader carrier frequency, which is for example equal to 13.56 MHz in ISO/IEC 14443.

The transmitter comprises an encoder 14 configured to perform here a Binary Phase Shift Keying (BPSK) data encoding.

The encoder provides to a modulator 17 (belonging to the transmitter) a data modulating signal SD using a subcarrier (here a 847.5 KHz subcarrier).

Figure 2:
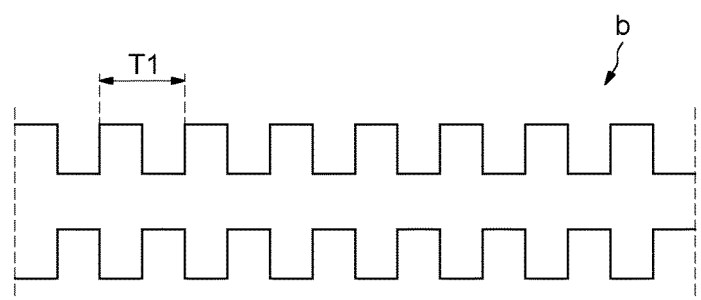

As illustrated in FIG. 2, one bit period of a bit b to be transmitted contains 8 subcarrier periods T1.

The logical value of the bit b depends on the state high or low of the beginning of the bit period. For example, a bit period beginning with a high state and finishing with a low state may be considered as being a logical "1" whereas a bit period beginning with a low state and finishing with a high state may be considered as being a logical "0". Of course, this convention could be inverted.

Figure 3:
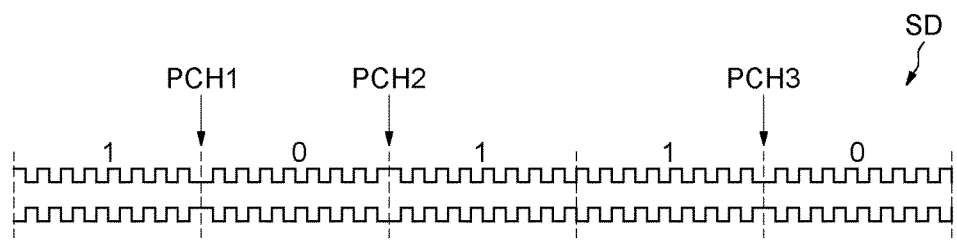

FIG. 3 illustrates an example of a series of bits 1, 0, 1, 0 contained in a data signal SD.

Figure 4:
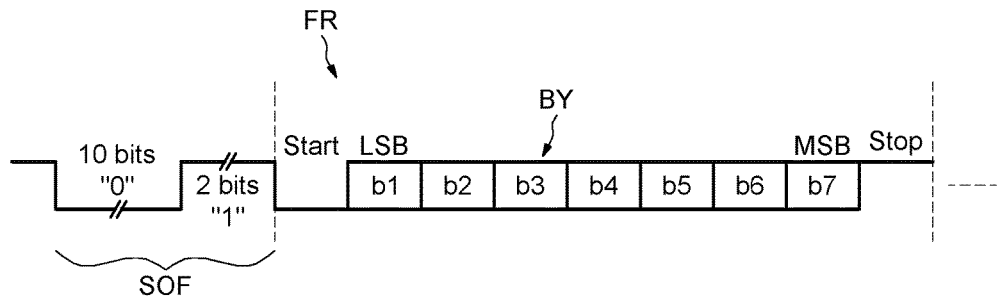

Data communication between the card and reader is performed using an LSB-first data format. Each byte BY of data is transmitted with a "0" start bit and a "1" stop bit as shown in FIG. 4. The stop bit, start bit, and each data bit are one elementary time unit (ETU) in length (9.439 µS). ISO/IEC 14443 defines a character (a byte) as comprising a start bit, eight data bits (LSB-first, MSB-last), and a stop bit.

Further each frame FR comprises before the first data byte BY, a so called Start of Frame (SOF) including at least in bits "0" and 2 bits "1".

The modulator 17 receive the modulating data signal SD as well as an ALM clock signal CKALM advantageously provided by a digital phase locked loop (DPLL) 16. The modulator 17 is configured to perform a subcarrier modulation with the data encoding for generating a signal STX to antenna ANT.

Figure 5:
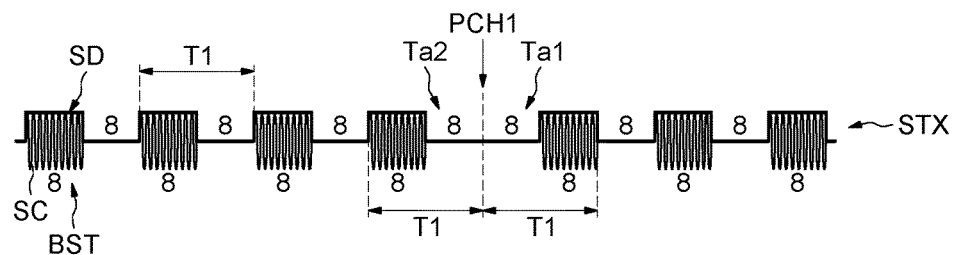

This signal STX comprises, as illustrated in FIG. 5, bursts BST of ALM carrier SC (the ALM carrier SC having a frequency equal here to 13.56 MHz).

Two consecutive bursts BST are separated by a gap wherein no signal is transmitted from the transponder to the reader.

Each half period of the subcarrier period T1 during which there is a signal transmission contains 8 periods of the carrier signal SC.

Figure 6:
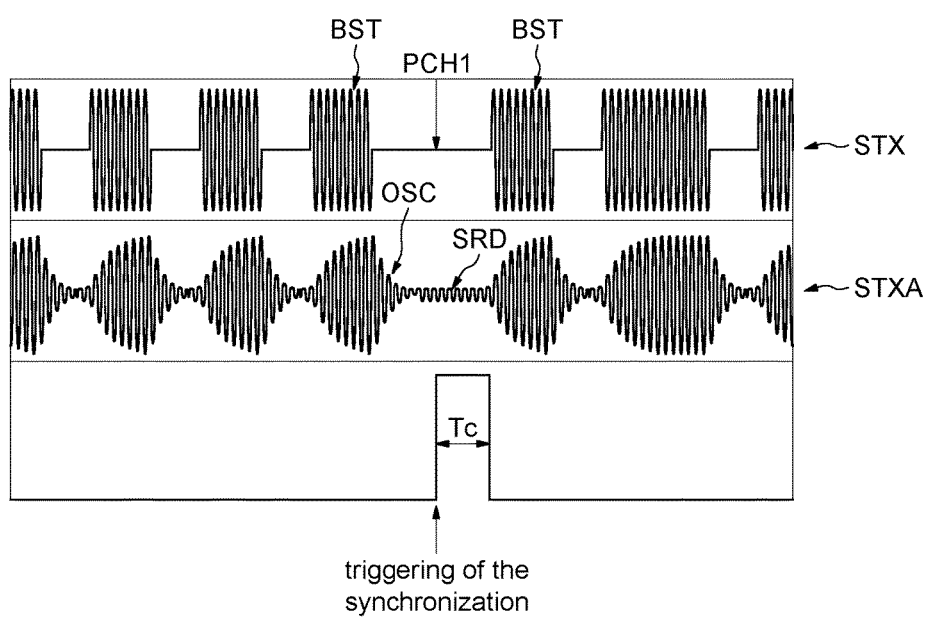

The signal STX and the corresponding signal STXA at the antenna are illustrated in FIG. 6.

As illustrated in this FIG. 6, each generation of ALM carrier burst BST produces after the generation, signal oscillation OSC at the antenna which naturally decays due to the quality factor of the antenna.

And this natural damping is sufficient to allow an in-frame synchronization, as it will be explained thereafter more in details, without the need of performing an additional controlled damping of the oscillations through a specific damping system.

In FIG. 6, the signal SRD present at the antenna corresponds to the reader carrier signal present on transponder antenna.

If we refer now again to FIG. 3, it appears that some phase changes PCH1, PCH2, PCH3 may occur during frame transmission.

Each phase change occurs when two consecutive bits having two different logical values are transmitted.

Depending on the transition 1 to 0 or 0 to 1 between two bits, the phase change may occur during a gap where there is no signal transmission from the transponder as for example phase changes PCH1 and PCH3 or during a period where there is signal transmission as for example phase change PCH2.

In other words, as illustrated on FIG. 5, a phase change like a phase change PCH1 occurs when no burst is generated during the half period Ta2 of the subcarrier preceding the phase change PCH1 and the half period Ta1 following this phase change.

And, this is such a phase change will be used for triggering resynchronization between the reader carrier frequency and the ALM carrier frequency.

This is illustrated in the bottom part of FIG. 6. The synchronization takes place during a synchronization period Tc beginning at each phase change of the PCH1 type, until generation of the next burst BST.

Turning now again to FIG. 1, the synchronization circuit is configured to perform the in-frame synchronization between the reader carrier frequency and the ALM carrier frequency at each phase change of the PCH1 type, comprises a digital phase locked loop (DPLL) 16 and a controller is 15 configured to deliver a control signal SCTRL at each phase change PCH1.

The controller may be implemented as a software module or by a logic circuit.

When the control signal SCTRL has a first logical value, the controller is configured to put the DPLL 16 in a hold mode in which the feedback loop is opened, between each in-frame synchronization.

And, at each phase change PCH1, the control signal STRL has a second logical value, in response of which the controller is configured to put the DPLL 16 in a lock mode closing the feedback loop for performing the in-frame synchronization during the synchronization period Tc.

Figure 7:
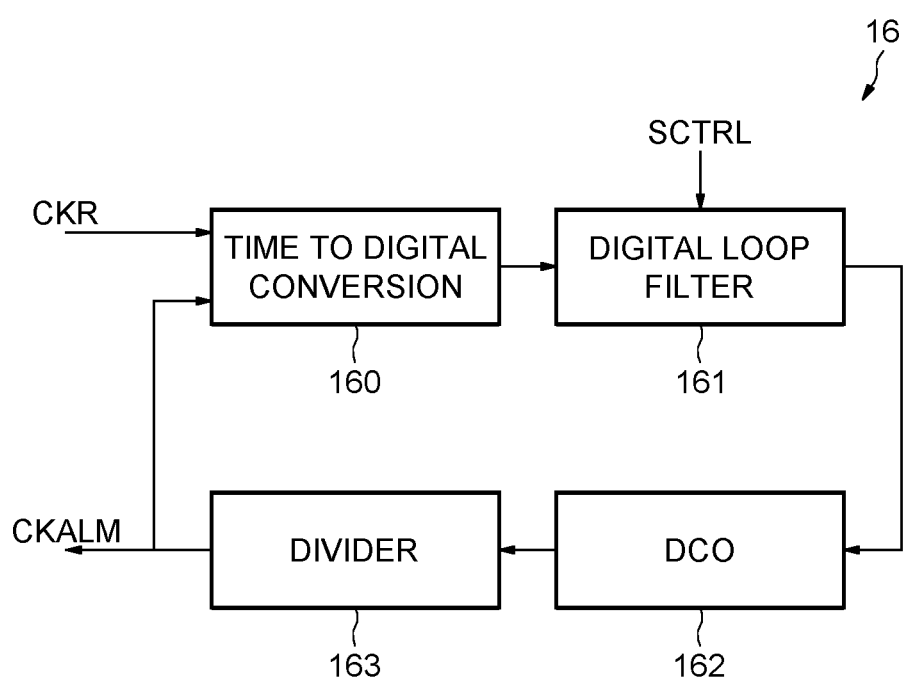

As illustrated in FIG. 7, the DPLL 16 comprises a time to digital converter based phase frequency detector 160 followed by a digital loop filter 161 followed by a digitally controlled oscillator (DCO) 162 followed by a divider 163, for example a fractional delta-sigma divider. The output of the divider is connected to the second entry of the time to digital converter based phase frequency detector 160.

Efficient implementation (small in size) requires running of DCO at high frequency (few hundred MHz or higher). It is the reason why the divider block is here provided to generate the ALM clock CKALM to be in phase with the reader carrier frequency (equal here to 13.56 MHz).

The first input of the time to digital converter based phase frequency detector 160 receives the clock signal CKR extracted from the reader carrier signal.

The DCO is controlled by a DCO control word delivered by the digital loop filter 161.

When, in response to the control signal SCTRL, the DPLL is put in hold mode, the feedback loop is opened and the last DCO control word before opening the loop, is stored and used to control the DCO in the hold mode.

As the DCO control is digital, the only source of frequency difference in system using DCO is difference of frequency generated by PLL system in which DCO is induced and the input carrier signal at the moment before the PLL is put on hold. DCO frequency at given control word value only drifts in case supply voltage or temperature change. These changes are negligible in time period which corresponds to duration of transponder reply (few tens of ms).

As indicated above, taking into account the structure of frame including a SOF, at least one BPSK phase change of the PCH1 type (i.e., where 16 carrier periods are available for synchronization) occurs per 12 bits. Taking into account the structure of a byte (start bit, eight data bits and stop bit) at least one BPSK phase change of the PCH1 type occurs per 10 bits. Of course depending on the logical values of the eight data bits of a transmitted byte of this frame, one or more other BPSK phase change of the PCH1 type may occur during the byte transmission, i.e., during the 10 bits duration.

But using a DPLL permits to meet the requirements of a stable generated frequency during the 12 bits duration when synchronization is eventually not done.

What is claimed is:

1. A method of wireless communication, the method comprising:
    transmitting frames from a transponder to a reader; and
    synchronizing between a reader carrier frequency and an active load modulation (ALM) carrier frequency within each transmitted frame;
    wherein each transmitted frame includes ALM carrier bursts generated from subcarrier modulation by binary phase shift keying (BPSK) data encoding and producing signal oscillations at a transponder antenna after each ALM carrier burst generation;
    wherein the synchronizing occurs at each phase change of the data encoding when no burst is generated during a half period of the subcarrier preceding the phase change and a half period of the subcarrier following this phase change; and
    wherein the transponder antenna has a moderate quality factor sufficient to naturally damp the signal oscillations so that the synchronizing is performed without performing any controlled signal oscillations damping.

2. The method according to claim 1, wherein the transponder antenna has a quality factor smaller than or equal to 8.

3. The method according to claim 2, wherein the transponder antenna has a quality factor greater than or equal to 4.

4. The method according to claim 1, wherein the transponder antenna has a quality factor greater than or equal to 4.

5. The method according to claim 1, wherein the ALM carrier is provided by a digital phase locked loop that includes a digitally controlled oscillator, the digital phase locked loop receiving the reader carrier and being in a hold mode in which a feedback loop of the digital phase locked loop is opened between each synchronization and in a lock mode in which the feedback loop is closed for performing each synchronization.

6. The method according to claim 5, wherein the transponder antenna has a quality factor between 4 and 8 and wherein the wireless communication is compliant with an ISO/IEC 14443 type B protocol.

7. The method according to claim 1, wherein the wireless communication is compliant with an ISO/IEC 14443 type B protocol.

8. A method of wireless communication, the method comprising:
    generating a plurality of frames from subcarrier modulation by binary phase shift keying (BPSK) data encoding, the plurality of frames that each including active load modulation (ALM) carrier bursts;
    producing signal oscillations at a transponder antenna after each ALM carrier burst generation;
    providing an ALM carrier using a digital phase locked loop that includes a digitally controlled oscillator; and
    synchronizing between a reader carrier frequency and an ALM carrier frequency at each phase change of the data encoding when no burst is generated during a half period of the subcarrier preceding the phase change and a half period of the subcarrier following this phase change, the digital phase locked loop receiving a reader carrier and being in a hold mode in which a feedback loop of the digital phase locked loop is opened between each synchronization and in a lock mode in which the feedback loop is closed for performing each synchronization, wherein the transponder antenna has a moderate quality factor sufficient to naturally damp the signal oscillations so that the synchronizing is performed without performing any controlled signal oscillations damping.

9. The method according to claim 8, wherein the transponder antenna has a quality factor smaller than or equal to 8.

10. The method according to claim 9, wherein the transponder antenna has a quality factor greater than or equal to 4.

11. The method according to claim 8, wherein the wireless communication is compliant with an ISO/IEC 14443 type B protocol.

12. A transponder, comprising:
    an antenna;
    a transmitter configured to transmit frames including active load modulation (ALM) carrier bursts to a reader through the antenna, the transmitter including an encoder configured to perform binary phase shift keying data encoding, the transmitter also including a modulator configured to perform a subcarrier modulation with the data encoding and to generate the ALM carrier bursts leading to signal oscillations at the antenna after each burst generation; and
    a synchronization circuit configured to perform, within each transmitted frame, synchronization between a reader carrier frequency and a carrier frequency of the ALM carrier bursts at each phase change of the data encoding when no burst is generated during a half period of the subcarrier preceding the phase change and a half period of the subcarrier following this phase change;
    wherein the antenna has a moderate quality factor sufficient to naturally damp the signal oscillations and permit the synchronization without performing any controlled signal oscillations damping.

13. The transponder according to claim 12, wherein the antenna has a quality factor smaller than or equal to 8.

14. The transponder according to claim 13, wherein the antenna has a quality factor greater than or equal to 4.

15. The transponder according to claim 12, wherein the antenna has a quality factor greater than or equal to 4.

16. The transponder according to claim 12, wherein the synchronization circuit comprises a digital phase locked loop.

17. The transponder according to claim 16, wherein the digital phase locked comprises a digitally controlled oscillator and a controller configured to put the digital phase locked loop in hold mode in which a feedback loop of the digital phase locked loop is opened between each synchronization and to close the feedback loop for performing each synchronization.

18. The transponder according to claim 12, wherein the transponder is configured to wirelessly communicate towards the reader according an ISO/IEC 14443 type B protocol.

* * * * *